United States Patent [19]

Salant et al.

[11] Patent Number: 4,643,437

[45] Date of Patent: Feb. 17, 1987

[54] MECHANICAL SEAL WITH AUTOMATIC GAP CONVERGENCE CONTROL

[75] Inventors: Richard F. Salant, Arlington Hts.; William E. Key, Schaumburg; Peter L. Kay, Arlington Hts., all of Ill.

[73] Assignee: Borg-Warner Industrial Products, Inc., Long Beach, Calif.

[21] Appl. No.: 840,369

[22] Filed: Mar. 17, 1986

Related U.S. Application Data

[63] Continuation of Ser. No. 789,889, Oct. 21, 1985, abandoned.

[51] Int. Cl.[4] .............................................. F16J 15/34
[52] U.S. Cl. .................................. 277/28; 277/81 R; 277/96.1; 277/901
[58] Field of Search .................. 277/1, 28, 81 R, 96.1, 277/901

[56] References Cited

U.S. PATENT DOCUMENTS

| | | | |
|---|---|---|---|
| 3,433,489 | 3/1969 | Wiese | 277/74 |
| 3,701,535 | 10/1972 | Born et al. | 277/28 X |
| 3,948,530 | 4/1976 | Gyory | 277/3 |
| 4,212,475 | 7/1980 | Sedy | 277/96.1 |
| 4,290,613 | 9/1981 | Scott | 277/96.1 |
| 4,424,975 | 1/1984 | Langebrake | 277/81 R |
| 4,434,987 | 3/1984 | Albers et al. | 277/901 X |
| 4,447,063 | 5/1984 | Kotzur et al. | 277/901 X |

FOREIGN PATENT DOCUMENTS 666345 6/1979 U.S.S.R. ............................. 277/901

OTHER PUBLICATIONS

Metcalfe, R., "Performance Analysis of Axisymmetric Flat Face Mechanical Seals," 6th International Conference on Fluid Sealing, Munich, West Germany (1973), 14 pp.

Lebeck, A. O., "Design of an Optimum Moving Wave and Tilt Mechanical Face Seal for Liquid Applications," 9th International Conference on Fluid Sealing, Noordwijkerhout, Netherlands (1981), 22 pp.

Salant, R. F. and Key, W. E., "Development of an Analytical Model for Use in Mechanical Seal Design," 10th International Conference on Fluid Sealing, Cranfield, England (1984), 19 pp.

Salant, R. F. and Key, W. E., "Improved Mechanical Seal Design Through Mathematical Modelling," 1st International Pump Symposium, Texas A&M University (1984), 10 pp.

Primary Examiner—Robert S. Ward
Attorney, Agent, or Firm—Julian Schachner

[57] ABSTRACT

A controllable mechanical seal for sealing a shaft rotatable relative to the housing of a fluid machine includes first and second face elements having first and second radial surfaces. The first element is adapted for rotation with the shaft. The second element is adapted to be stationary within the housing. One of the elements is movable axially relative to the shaft. The first and second surfaces are adapted to define a gap within which there is a thin lubricating fluid film. An actuator is provided for deforming at least one of the surfaces so that the gap converges in a direction from a high pressure side to a low pressure side of the seal. A sensor is provided for measuring a temperature indicative of incipient contact of said surfaces. A control system responsive to the sensor generates an external voltage which is applied to the actuator to control the convergence of the surfaces and thus maintain an optimum thickness of the lubricating film for a wide range of operating conditions.

30 Claims, 6 Drawing Figures

MECHANICAL SEAL WITH AUTOMATIC GAP CONVERGENCE CONTROL

This is a continuation of application Ser. No. 789,889 filed Oct. 21, 1985, now abandoned.

BACKGROUND OF THE INVENTION

1. Field of the Invention

This invention relates generally to a mechanical seal for sealing a rotatable shaft in the housing of a fluid machine against leakage of fluids along the shaft. More particularly, it relates to a controllable mechanical seal wherein the thickness of a thin lubricating fluid film separating two seal face elements is controlled by an externally applied voltage.

2. Description of the Prior Art

In order to assist in a better understanding of the invention, its operation and its advantages, it is believed that a preliminary discussion of mechanical seals in general is in order. As will be appreciated by those skilled in the art, a mechanical seal is formed with two face elements. One element is attached to the housing of the machine to be sealed, and the other is attached to and rotates with the shaft. One of the elements is fixed so that no movement occurs axially relative to the shaft. It is referred to as the fixed face element. The other is movable axially along the shaft, and is referred to as the floating face element. The face elements are located in opposed relationship to each other, and are arranged so that in response to fluid pressure, spring pressure or both, a sealing relationship will be obtained between them to prevent leakage out along the shaft.

It has been found that a successful mechanical seal is obtained not when the elements are in direct physical contact with each other, but rather when a thin lubricating fluid film is provided between their opposing face surfaces during steady state operation. This fluid film prevents or reduces wear due to direct mechanical contact of the elements, thereby avoiding the possibility of mechanical damage or failure of the seal. However, the thickness of the fluid film must not be too large, as this will cause excessive leakage.

Further, it has been found that the thickness of the fluid film is determined by the precise geometry of the face surfaces. In particular, if the two face surfaces are perfectly flat and parallel, such that a uniform gap is formed between them, the floating element will move into physical contact with the fixed element. The fluid film will collapse, resulting in a zero film thickness. In order to maintain a finite film thickness so as to prevent such a collapse, a sufficiently large opening force, which tends to move the floating element away from the fixed element, must be generated by fluid pressure within the gap. For this to happen, the opposing surfaces must not be parallel, but rather must converge radially in the direction from the high pressure side to the low pressure side of the seal. If this convergence is increased, the opening force will increase and the film thickness will be increased. Similarly, if the convergence is decreased, the film thickness will be decreased.

Generally, mechanical seals are manufactured with the face elements designed such that their face surfaces have a predetermined convergence during steady state operation of the machine, taking into account the anticipated thermal and mechanical deformations of the elements. Thus a reasonable film thickness is realized. It should be understood that the thickness of film is relatively small, on the order of approximately 50–200 microinches. The deformations are equally small, on the order of approximately 20–100 microinches. Heretofore, conventional mechanical seals have been designed and built very carefully based upon all the anticipated deformations so as to produce an acceptable film thickness at the condition of steady state operation. The film thickness was dependent upon the seal design characteristics, such as type of material, configuration, etc., and operating conditions such as temperature, pressure, speed, load and fluid characteristics. Thus the film thickness could not be controlled once the seal had been placed into service. Accordingly, conventional seals would experience face damage and wear when a wide range of operating conditions, including transients, was encountered.

It would therefore be desirable to provide a controllable mechanical seal in which the thickness of a thin fluid film separating two seal face elements could be controlled by external means. If this controllable feature could be provided, the thickness of the film could be varied in response to changes in the operating conditions so as to maintain an optimum film thickness for a wide range of such conditions.

In U.S. Pat. No. 3,433,489, issued to W. J. Wiese on Mar. 18, 1969 and assigned to the assignee of this application, there is disclosed a mechanical seal assembly which includes a collector ring formed in one of the sealing face elements. Fluid flowing past the elements is collected in the collector ring and flows into a pressure chamber so as to produce a fluid pressure under certain operating conditions. This fluid pressure is applied to the element having the pressure chamber in an effort to control leakage past the elements.

In U.S. Pat. 3,948,530, issued to E. J. Gyory on Apr. 6, 1976 and also assigned to the assignee of this application, there is disclosed an externally adjustable mechanical seal in which hydrostatic pressure is applied to a pair of axially spaced pressure areas on the external surface of a stationary sealing element. The pressure areas communicate with pressure passages which are appropriately valved to provide settings for high pressure, low pressure or atmospheric pressure to be communicated with one or both of the pressure areas. As a result, the element is deformed to provide full surface contact, internal diameter surface contact, or external diameter surface contact of the sealing elements.

U.S. Pat. No. 4,434,987, issued to Albers et al on Mar. 6, 1984, discloses a seal device which includes a seal ring rotatable with a shaft. This rotating seal ring is surrounded on both of its radially extending surfaces and on its circumferentially extending surface by a non-rotatable but slidable seal ring connected to a housing. Sensors are connected to the non-rotatable seal ring for sensing the width of each radial plane gap. Control means is responsive to the sensors for activating an electromagnet which develops a magnetic force which slides the non-rotatable seal ring in order to maintain a selective width for the radial plane gaps.

There remains a need in the art for a controllable mechanical seal wherein the thickness of a thin lubricating fluid film separating two seal face elements is controlled by an externally developed force which is applied to at least one of the elements so as to cause deformation of its face surface. By controlling this deformation, the convergence of the opposing face surfaces is adjustable. The opening force is thus controllable such that an optimum film thickness may be obtained for a wide range of operating conditions.

SUMMARY OF THE INVENTION

This invention is directed to meeting this need. To that end, there is disclosed a controllable mechanical seal for a fluid machine having a housing and a shaft rotatable relative to the housing. The seal includes a first face element rotatable with the shaft and a second face element supported by the housing. The first and second elements respectively define first and second face surfaces. One of the elements is slidable along the shaft toward and away from the other element to establish a gap between the surfaces. Suitable means biases the one element toward the other. Means are provided for adjusting the convergence of the surfaces to change the pressure profile within the gap and thus cause a change in the width of the gap.

BRIEF DESCRIPTION OF THE DRAWINGS

The objects and advantages of the present invention will become more fully apparent from the following detailed description when read in conjunction with the accompanying drawings, with like reference numbers indicating corresponding parts, wherein.

DESCRIPTION OF THE PREFERRED EMBODIMENTS

Figure 1:
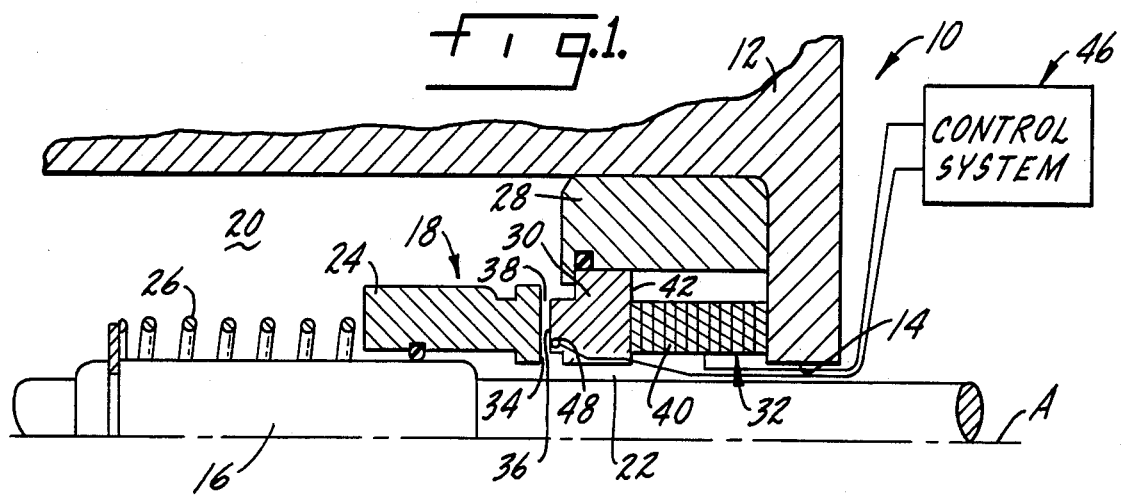
FIG. 1 is a longitudinal sectional view of a controllable mechanical seal constructed in accordance with the principles of the present invention.

Referring in detail to the various views of drawings, there is shown in FIG. 1 a fluid machine 10 which includes a housing 12 in which fluid is contained. Housing 12 has a counterbore or opening 14 through which extends a shaft 16 adapted for rotation on its longitudinal axis A relative to housing 12.

A controllable mechanical seal 18 is provided to prevent excessive leakage of fluid from a high pressure environment 20 to a low pressure environment 22. Mechanical seal 18 includes a first face element 24 which is suitably attached to shaft 16 for rotation therewith. Face elements 24 is slidable relative to the shaft axially along axis A. Suitable biasing means 26, such as a spring, biases face element 24 for movement toward the right as shown in FIG. 1.

Mechanical seal 18 further includes a holder 28 which is fixedly secured to housing 12. Holder 28 supports a second face element 30 and an actuator 32 in housing 12. The outer diameter of second face element 30 is fixed so that no axial movement is permitted relative to shaft 16. Actuator 32 preferably is of the electromechanical type, and may be formed from a piezoelectric material, such as lead zirconate titanate or the like, which will elongate when an external voltage is applied to it. This elongation causes deformation of second face element 30.

Face element 24 is shown to be rotatable with shaft 16, and face element 30 is shown to be non-rotatable. However, it should be clearly understood that either element could be rotatable, with the other being non-rotatable. Similarly, while element 24 is shown to be floating (movable axially along shaft 16), and element 30 is shown to be fixed (non-movable axially relative to shaft 16), either could be the floating element, with the other being fixed. Also, it should be understood that actuator 32 could be associated with either element, or could be an integral part of an element rather than a separate component. For convenience herein, element 24 is considered to be both rotatable and floating, with element 30 being nonrotatable and fixed. Actuator 32 is considered to be a separate component associated with element 30.

Element 24 has a radial face surface 34. Similarly, element 30 has a radial face surface 36 which opposes surface 34. Together they form sealing face surfaces 34,36.

The floating and fixed face elements 24 and 30 may be formed from similar materials or from different materials. One is typically made of a hard material such as sintered carbide, silicon carbide, Stellite or the like. The other is usually formed of a soft material such as carbon, carbon-graphite, bronze or the like.

As was previously mentioned, in a successful mechanical seal a thin lubricating film is required in a gap 38 between elements 24 and 30. The thickness of this film must be large enough to reduce wear and/or seizure of the elements, but small enough to prevent excessive leakage. Thus an optimum film thickness should be maintained in the gap separating surfaces 34 and 36 to effect proper operation of the mechanical seal.

Figure 2:
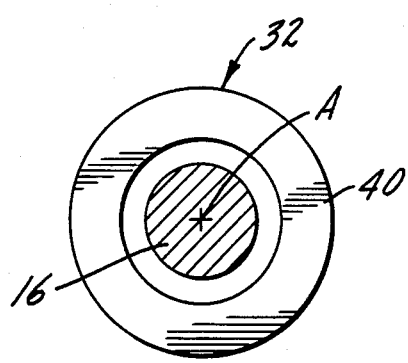
FIG. 2 is a cross-sectional view of a piezoelectric actuator suitable for use in the seal of FIG. 1.

The width of the gap, and thus the thickness of the film, is controlled externally by the application of a voltage of piezoelectric actuator 32. This actuator may be a single annular ring, but preferably is constructed of a stack of annular rings 40 as shown in FIGS. 1 and 2. These annular rings, formed of a piezoelectric material, are oriented so that when an external voltage is applied to them, they will expand in the axial direction. Actuator 32 exerts an axial force which is applied to the back 42 of element 30, thereby placing it under stress. The resultant strain causes surface 36 of element 30 to deform so that a converging gap between opposed sealing surfaces 34 and 36 is produced. As the voltage is increased (decreased), this force will be increased (decreased), and thus a greater (lesser) convergence will be obtained. Since a greater (lesser) convergence produces a thicker (thinner) fluid film, the precise thickness of the film can be controlled by increasing (decreasing) the applied voltage.

Figure 3:
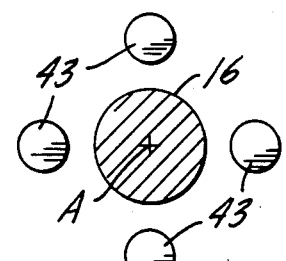
FIG. 3 is a cross-sectional view of an alternate piezoelectric actuator suitable for use in the seal of FIG. 1.

The stack of annular rings 40 is disposed coaxially relative to shaft 16. While the rings are continuous as shown in FIG. 2, they could be segmented. Similarly, they could be stacks of discs 43 spaced circumferentially around shaft 16 as shown in FIG. 3. If stacks of segments or discs were used, the same voltage typically would be applied to each so as to produce a uniform gap. However, different voltages could be applied to them so as to compensate for any misalignment of the sealing surfaces and still produce a uniform gap.

Figure 4:
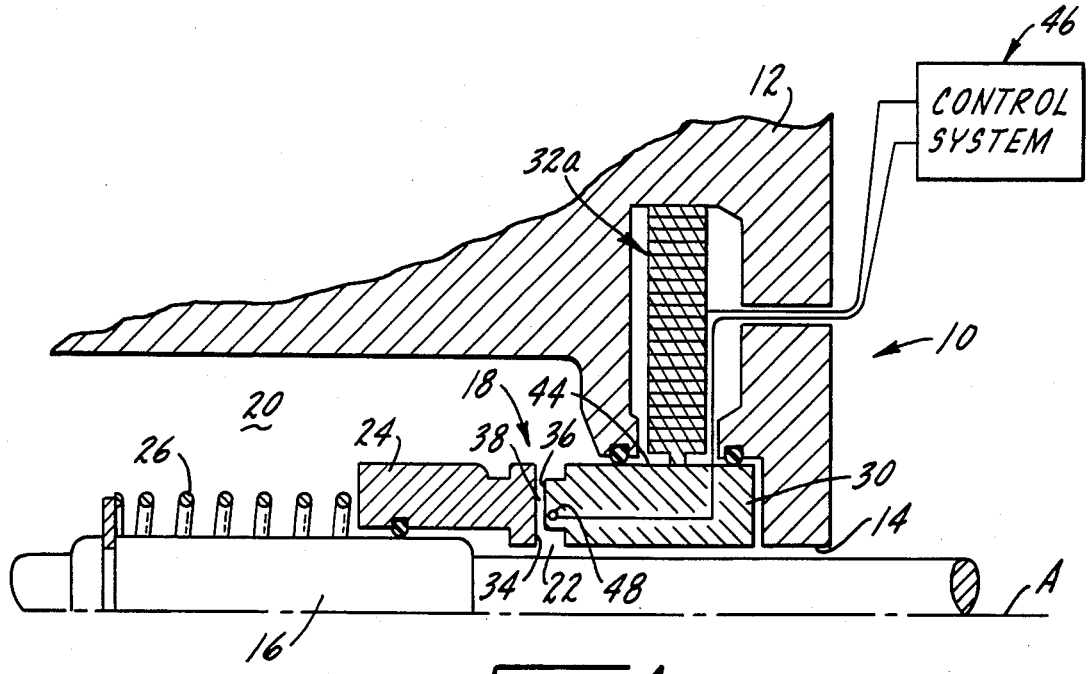
FIG. 4 is a longitudinal sectional view of a second embodiment of a controllable mechanical seal constructed in accordance with the principles of the present invention.

A second embodiment of a controllable mechanical seal of the present invention is shown in FIG. 4. In order to deform surface 36 of element 30, a plurality of spaced piezoelectric actuators 32a, similar to the actuators shown in FIG. 3, and one of which is shown in FIG. 4, are responsive to an external voltage to apply radial forces to the side 44 of element 30, causing it to bend into an hour-glass configuration. As a result, a converging gap is produced between surfaces 34 and 36. Again, the same external voltage typically would be applied to each actuator, or different voltages could be applied so as to compensate for any misalignment of the surfaces and still produce a uniform gap.

Figure 5:
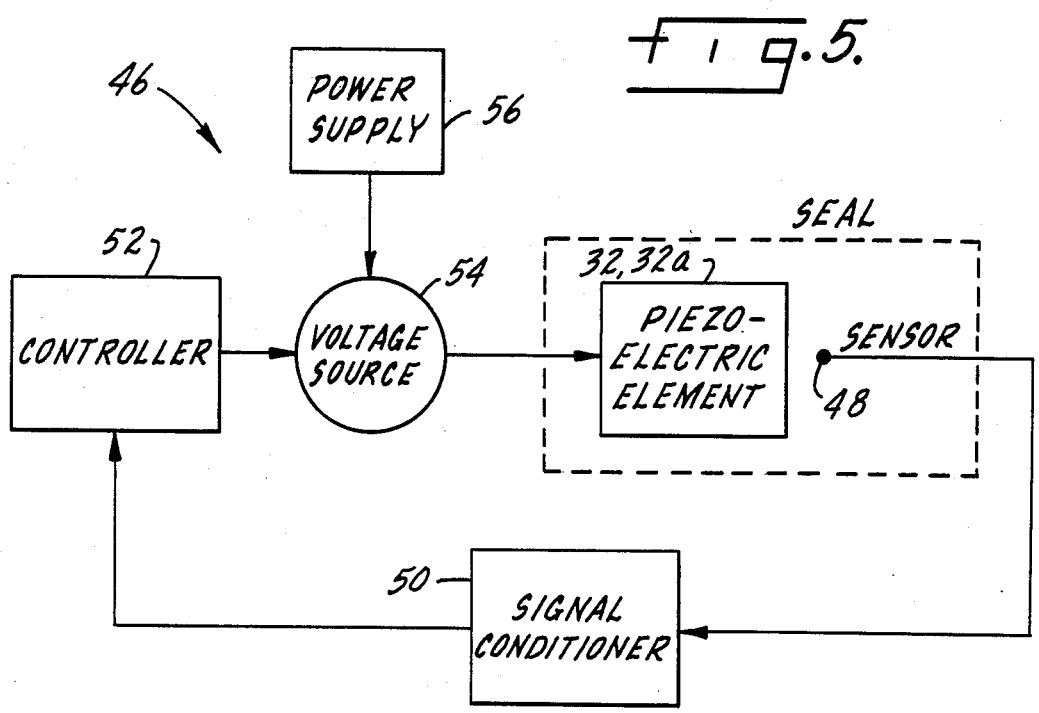
FIG. 5 is a block diagram of a control system suitable for use with the controllable mechanical seal of FIGS. 1 and 4.

FIG. 5 is a diagram of a control system 46, suitable for use with the controllable mechanical seal of FIGS. 1 and 4, which will generate and regulate automatically the external voltage applied to piezoelectric actuator 32 or 32a so as to maintain an optimum film thickness. As can be seen, a sensor 48 is suitably imbedded in one of the elements, for example element 30, for providing a signal indicative of the gap between surfaces 34 and 36. Sensor 48 is preferably a thermocouple which senses a temperature which is related to the thickness of the gap. Specifically, it senses a temperature increase when contact between the faces is imminent. A signal conditioner 50 is responsive to the thermocouple output and generates an electrical signal representative thereof. This signal is fed to a controller 52 which will adjust by increasing a voltage 54 from a power supply 56. This voltage 54 is applied to piezoelectric actuator 32 or 32a for deforming surface 36 so as to increase the thickness of gap 38. When the sensed temperature decreases, indicating an excessively wide gap, the applied voltage is correspondingly decreased to decrease gap width.

Controller 52 also decreases voltage 54 for testing gap width in accordance with a predetermined program. Details of control system 46, including controller 52, are disclosed in U.S. application Ser. No. 789,890 filed Oct. 21, 1985 and assigned to the same assignee as this application.

Figure 6:
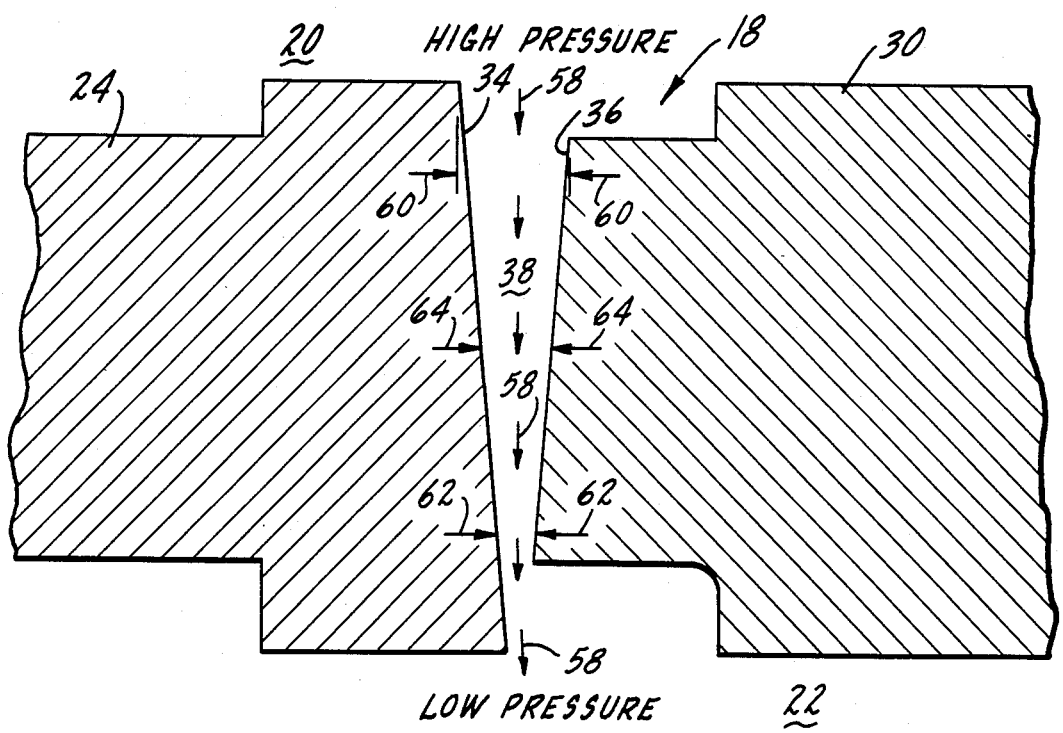
FIG. 6 is an enlarged longitudinal sectional view, not to scale, illustrating the gap between the first and second faces in the controllable mechanical seal of the present invention.

A discussion of the operation of controllable mechanical seal 18 will now be described with reference to FIG. 6. This is believed to be necessary for an understanding of the principles involved in the invention, as well as the advantages obtained therefrom.

The fluid and spring forces acting on element 24 in one direction comprise a net closing force tending to move it axially toward element 30. The fluid forces within gap 38 acting on element 24 in the opposite direction comprise a net opening force tending to move it axially away from element 30. During steady state operation of the machine, the net opening and closing forces must balance for the system to be in equilibrium. This resultant force balance determines the width of gap 38 between surfaces 34 and 36, and thus determines the thickness of the fluid film.

As was previously discussed, surfaces 34 and 36 in a successful seal must converge radially in the direction along arrows 58 from the high pressure side 20 to the low pressure side 22 of seal 18. Assuming that the high pressure side is on the outer diameter of the seal and the low pressure side is on the inner diameter, surfaces 34 and 36 must converge from the outer diameter to the inner diameter. This convergence C is defined herein to be the difference between the gap width or film thickness $T_o$ measured at the outer diameter (arrows 60) and the gap width or film thickness $T_i$ measured at the inner diameter (arrows 62). The degree of convergence D is defined herein to be the ratio of convergence C to some gap width or film thickness T. For convenience, the average gap width or film thickness $(T_o+T_i)/2=T$ (arrows 64) is used. In other words, $D=C/T$. The pressure profile in the gap and the net opening force both are determined by the degree of convergence D. The larger the degree of convergence, the larger the opening force.

Assuming that machine 10 is operating in a stable condition, the degree of convergence D designed into the seal will correspond to some average film thickness having an optimum value for this particular operating condition. The degree of convergence D will be substantially constant when the net opening and closing forces are in equilibrium. If there is a change in some operating condition, such as by start-up, shut-down, speed change during operation, temperature variation, pressure change, change in the characteristics of the particular fluid used in a machine and the like, this equilibrium will be upset. Floating face element 24 will be moved either toward or away from fixed face element 30. As a consequence, the average film thickness T will be changed.

If the changed operating conditions produce a film thickness which is so small that imminent surface contact is sensed by thermocouple 48, control system 46 will apply an increased voltage 54 so as to increase the deformation of surface 36 and thus increase the convergence C. On the other hand, the changed operating condition may produce a film thickness which is so large that excessive leakage occurs. During a periodic test in accordance with the predetermined program referred to in the aforementioned U.S. application Ser. No. 789,890, control system 46 will apply a decreased voltage 54 so as to reduce the deformation of surface 36 and thus decrease the convergence C.

In this manner, the pressure profile in the gap is changed so that a new opening force is produced. Since the closing force remains substantially constant, element 24 will react by moving axially toward or away from element 30 until the force balance is restored and the degree of convergence D is returned to its initial value. Equilibrium is restored at a point where a new average film thickness has an optimum value for the new operating condition.

This procedure may be continuously or periodically repeated in order to adjust the deformation of surface 36, adjust convergence C, and thereby control T.

While the above explanation has referred to the deformation of surface 36 of element 30, it will be understood by those skilled in the art that either surface, or both, may be deformed to produce the same result.

From the foregoing it will thus be seen that this invention provides a controllable mechanical seal. In an open loop configuration, the thickness of a thin lubricating fluid film separating two face elements is controlled by an externally applied voltage which causes deformation of at least one of the two face surfaces.

In a closed loop configuration, a sensor is provided for indicating the width of the gap between the two surfaces. A control system responsive to the sensor generates the external voltage which is applied to a piezoelectric actuator to control the convergence of the surfaces and thus maintain an optimum thickness of the lubricating film for a wide range of operating conditions.

While there has been illustrated and described what are considered to be preferred embodiments of the present invention, it will be understood by those skilled in the art that various changes and modifications may be made, and that equivalents may be substituted for elements thereof without departing from the true scope of the invention. In addition, many modifications may be made to adapt the teachings of the invention to a particular situation without departing from the scope thereof. Therefore, it is intended that this invention not be limited to the particular embodiments disclosed as the best modes contemplated for carrying out the invention, but rather that it include all embodiments within the scope of the appended claims.

What is claimed is:

1. A controllable mechanical seal for sealing a shaft rotatable relative to the housing of a fluid machine, said seal comprising a first face element having a first radial face surface, said first element being adapted for rotation with the shaft, a second face element having a second radial face surface, said second element being adapted to be supported within the housing, one of said elements being movable axially along the shaft, said first and second surfaces being adapted to define a gap which converges from a high pressure side to a low pressure side of said seal and within which there is a thin lubricating fluid film, actuating means for deforming at least one of said elements to thereby adjust the convergence of said surfaces, sensing means for generating a signal indicative of a condition of the gap, and control means responsive to said signal for generating an output which is applied to said actuating means to control said deformation and thus maintain an optimum thickness of the lubricating film for a wide range of operating conditions.

2. The controllable mechanical seal of claim 1, wherein said actuating means includes an electromechanical actuator.

3. The controllable mechanical seal of claim 1, wherein said actuating means includes a piezoelectric actuator.

4. The controllable mechanical seal of claim 3, wherein said piezoelectric actuator applies a force to said second element in order to deform it.

5. The controllable mechanical seal of claim 3, wherein said piezoelectric actuator includes at least one annular ring coaxial with the shaft.

6. The controllable mechanical seal of claim 3, wherein said piezoelectric actuator includes a plurality of stacks of ring segments spaced around the shaft.

7. The controllable mechanical seal of claim 3, wherein said piezoelectric actuator includes a plurality of stacks of discs spaced around the shaft.

8. The controllable mechanical seal of claim 1, wherein said gap condition is incipient contact of said surfaces.

9. The controllable mechanical seal of claim 8, wherein said actuating means includes a piezoelectric actuator, and said output is a voltage.

10. The controllable mechanical seal of claim 9, wherein said control means increases its output voltage so as to increase the convergence of said surfaces and thereby obtain a thicker film, and decreases its output voltage so as to decrease the convergence of said surfaces and thereby obtain a thinner film.

11. The controllable mechanical seal of claim 8, wherein said sensing means includes a thermocouple supported by one of said elements.

12. The controllable mechanical seal of claim 8, wherein said sensing means includes a thermocouple supported by said second element.

13. The controllable mechanical seal of claim 4, wherein said force is applied axially relative to the shaft.

14. The controllable mechanical seal of claim 4, wherein said force is applied radially relative to the shaft.

15. A controllable mechanical seal for sealing a shaft rotatable relative to the housing of a fluid machine, said seal comprising a first face element having a first radial face surface, said first element being adapted for rotation with the shaft, a second face element having a second radial face surface, said second element being adapted to be supported within the housing, one of said elements being movable axially along the shaft, said first and second surfaces being adapted to define a gap within which there is a thin lubricating fluid film, a piezoelectric actuator coupled to one of said elements to deform its surface so that the gap converges in a direction from a high pressure side to a low pressure side of said seal, a thermocouple imbedded in one of said elements for measuring a temperature indicative of incipient contact of said surfaces, and a control system responsive to the temperature measurement for generating a voltage which is applied to said piezoelectric actuator to control the convergence of the surfaces and thus maintain an optimum thickness of the lubricating film for a wide range of operating conditions.

16. The controllable mechanical seal of claim 15, wherein said piezoelectric actuator includes at least one annular ring coaxial with the shaft.

17. The controllable mechanical seal of claim 15, wherein said piezoelectric actuator includes a plurality of stacks of ring segments spaced around the shaft.

18. The controllable mechanical seal of claim 15, wherein said piezoelectric actuator includes a stack of annular rings.

19. The controllable mechanical seal of claim 15, wherein said piezoelectric actuator includes a plurality of stacks of discs spaced around the shaft.

20. A controllable mechanical seal for a fluid machine having a housing and a shaft rotatable relative to the housing, said seal comprising a first face element rotatable with the shaft, a second face element supported by the housing, said first and second elements respectively defining first and second face surfaces, one of said elements being slidable along the shaft toward and away from the other of said elements to establish a gap between said surfaces, means biasing said one element toward said other element, said elements at a given operating condition of the machine having a degree of convergence substantially equal to the convergence of said surfaces divided by the average width of said gap, and means for adjusting the convergence of said surfaces to thereby change the width of said gap.

21. The controllable mechanical seal of claim 20, wherein said adjusting means includes means for stressing an element such that the resulting strain effects adjustment of the convergence of said surfaces.

22. The controllable mechanical seal of claim 20, said adjusting means including actuating means for exerting force on an element such that its surface deforms to effect adjustment of the convergence of said surfaces.

23. The controllable mechanical seal of claim 22, said actuating means being responsive to a voltage applied thereto for exerting force.

24. The controllable mechanical seal of claim 23, said actuating means including at least one piezoelectric actuator.

25. The controllable mechanical seal of claim 24, said piezoelectric actuator exerting force on said other element.

26. The controllable mechanical seal of claim 25, said piezoelectric actuator exerting force on said other element in a direction substantially parallel to said shaft.

27. The controllable mechanical seal of claim 25, said piezoelectric actuator exerting force on said other element in a direction substantially normal to said shaft.

28. A controllable mechanical seal for a fluid machine having a housing and a shaft rotatable relative to the housing, said seal comprising a first face element rotatable with the shaft, a second face element supported by the housing, said first and second elements respectively defining first and second face surfaces, one of said elements being slidable along the shaft toward and away from the other of said elements to establish a gap between said surfaces, means biasing said one element toward said other element, said elements at a given operating condition of the machine having a degree of convergence substantially equal to the convergence of said surfaces divided by the average width of said gap, means for sensing a change in the width of said gap indicative of a change in the machine operating condition, and means responsive to the sensed change for adjusting the convergence of said surfaces such that the gap width is changed, whereby said seal compensates for the change in the machine operating condition.

29. The controllable mechanical seal of claim 28, said sensed change being incipient contact of said surfaces.

30. The controllable mechanical seal of claim 29, said sensing means including a thermocouple which senses a temperature increase upon incipient contact of said surfaces.

* * * * *